United States Patent [19]

Kiefer et al.

[11] 4,253,364
[45] Mar. 3, 1981

[54] APPARATUS FOR DISCHARGING AND SEPARATING SKIN PACKAGES

[75] Inventors: Günther Kiefer, Schwaigern; Helmut Karbach, Frankenbach, both of Fed. Rep. of Germany

[73] Assignee: Adolf Illig Maschinenbau GmbH & Co., Heilbronn, Fed. Rep. of Germany

[21] Appl. No.: 59,022

[22] Filed: Jul. 19, 1979

[30] Foreign Application Priority Data

Jul. 22, 1978 [DE] Fed. Rep. of Germany ....... 2832365

[51] Int. Cl.³ ............................................. B65B 61/16
[52] U.S. Cl. ........................................ 83/217; 83/218; 83/248; 83/255; 83/277; 83/527; 83/620; 83/682; 83/925 R; 53/509
[58] Field of Search ................. 83/203, 205, 217, 218, 83/240, 248, 255, 277, 527, 528, 571, 572, 620, 682, 405, 407, 925 R, 926 R; 53/509

[56] References Cited

U.S. PATENT DOCUMENTS

| | | | |
|---|---|---|---|
| 2,204,405 | 6/1940 | Dunlap | 83/528 |
| 3,888,066 | 6/1975 | Tabur | 83/302 X |

*Primary Examiner*—J. M. Meister
*Attorney, Agent, or Firm*—Spencer & Kaye

[57] ABSTRACT

An apparatus for withdrawing a continuous band of multi-article skin packages from a skin packing machine includes a clamping device for periodically grasping the band and stepwise withdrawing it from the skin packing machine in a direction of band feed; a first cutter for severing the band parallel to the direction of band feed; and a second cutter for severing the band transversely to the direction of band feed. The two cutters can divide each multi-article skin package into smaller, single-article packages. The apparatus further has a punch for providing hanger holes in the packages simultaneously with the severing operation of the second cutter; a sled carrying the clamping device, the second cutter and the punch back and forth parallel to the direction of band feed. A control intermittently and simultaneously actuates the second cutter and the punch at predeterminable locations when the sled travels against the direction of band feed. There is further provided a deactivating arrangement for rendering the punch inoperative at predeterminable positions of the sled.

5 Claims, 6 Drawing Figures

APPARATUS FOR DISCHARGING AND SEPARATING SKIN PACKAGES

BACKGROUND OF THE INVENTION

This invention relates to an apparatus for discharging and separating a band of interconnected skin packages. Such an apparatus is coupled downstream of a skin packing machine into which the cardboard supports are fed and which applies thereto a skin foil taken from a supply roll. In each operational cycle, a new multi-article package is made, connected to the preceding package. The discharging and separating apparatus to which the invention relates, takes over conveyance of the packages out of the packaging machine by executing a feeding step which corresponds approximately to the length of the cardboard support. The separation of the multi-article package into single-article packages is effected by longitudinal and transverse cuts and further, hanger holes are punched into the cardboard support. At least the transverse cutting and the punching of hanger holes are effected during the making of the successive multi-article skin package.

The transverse cutting device is mounted on a sled which includes a device for grasping the band and which, after the band has been conveyed out of the skin packaging machine, moves intermittently in a direction opposite to the conveying direction of the band. During this occurrence, the cutting device executes the transverse cuts at predetermined locations and, at the same time, the hanger holes are punched out. The longitudinal cuts are effected either during the conveyance of the band out of the skin packing machine, or during the return motion of the sled by means of a lengthwise cutter known by itself.

An apparatus of the above-outlined type is known and is disclosed, for example, in German Gebrauchsmuster (Utility Model) No. 7,345,865. Between two successive multi-article packages there remains an intermediate web which is separated by the transverse cutter as scrap, while the sled is advanced only slightly between the two cuts producing this scrapped strip. It is, of course, a desideratum to maintain the intermediate web as small as possible and thus, in case of thin cardboard supports, the two cardboard supports of the two successive multi-article skin packages may abut one another. In such a case the cardboard support can be so designed that only an approximately 5 mm wide scrap is obtained from each multi-article package, or a scrap of a total width of 10 mm. In such a case, the sled carrying the transverse cutter would travel approximately 10 mm after the last transverse cut through a multi-article skin package and would only then execute the first transverse cut at the successive skin package. This, however, is not feasible in practice because of the operation of the hole punches for the hanger holes. The hanger hole and its distance from the outer edge of a skin package are standardized in DIN (German Industrial Standard) 55 512, page 1. Thus, the distance from the outer edge is at least 7 mm and the width of the hanger hole is at least 8.5 mm. Thus, in order to ensure that upon executing the last transverse cut in the multi-article skin package, the hanger hole is not punched into the first article row of the successive multi-article package, there must be provided an intermediate space of approximately 20 mm between the two packages. Dependent upon the hanger hole, this distance may have to be even greater.

The cardboard supports, however, cannot be abutted against one another if they are relatively thick; in such a case an intermediate space must remain therebetween, because if a thick cardboard is clamped by the tensioning frame in the skin packing machine, leaks in the vacuum package cannot be avoided. Therefore, between two multi-article packages, there is left an intermediate web having a width that corresponds to that of the tensioning frame, that is, approximately 20 mm. Consequently, in this zone there extends solely the skin foil which has a thickness of approximately 0.1 mm.

Upon performing the last transverse cut on a multi-article package, the hole punches are operating in the scrap zone which is formed only by the thin synthetic foil unless there is provided an additional 20 mm width of cardboard scrap. If the hole punches are to cut only the thin synthetic foils, problems are encountered in that the cut of the punch is not a full circle and thus foil portions are drawn into the space between the punch and the matrix. This is so because a certain gap must remain between the punch and the matrix and upon installing and adjusting the hole punch and the matrix, the gap is, in most cases, shifted to one side. This can usually not be avoided, because the punch and the matrix cooperate as shears; the matrix is aligned with the punch in the lowered position of the punch by pressing the matrix thereagainst. Such an arrangement has no disadvantageous effects for punching a cardboard, but if the foil is drawn in between the punch and the matrix, the scrap remains connected at one location with the foil and thus hangs into the matrix after the transverse cutter is open. A subsequent advance of the sled to the next cutting position therefore leads inevitably to operational disturbances.

SUMMARY OF THE INVENTION

It is an object of the invention to provide an improved apparatus of the above-outlined type in which the scrap width between two successive multi-article packages can be maintained at a minimum without obtaining hole cuts in undesired locations, while, at the same time, avoiding the above-discussed disadvantages involved in punching holes solely in the skin foil.

This object and others to become apparent as the specification progresses, are accomplished by the invention, according to which, briefly stated, the hole punches for stamping hanger holes are height-adjustable with respect to the upper transverse cutting knife and, before the last transverse cut, are lifted off the multi-article package, so that the punches, during the last transverse cut, do not cooperate with the respective matrices.

Thus, according to the invention, there is effected no punching operation during the last transverse cut and consequently the beginning portion of the successive multi-article package or only the skin foil may be situated underneath the hole punches without being cut thereby as the last transverse severing cut is performed on the preceding package.

The lifting of the hole punch is effected either after a predetermined number of transverse cuts or by providing that the punches are lifted at a predetermined location (which is traversed in any event for performing the transverse severing cut). At such a location, there is thus applied an additional signal to the punch-lifting arrangement.

DESCRIPTION OF THE PREFERRED EMBODIMENT

Figure 1:
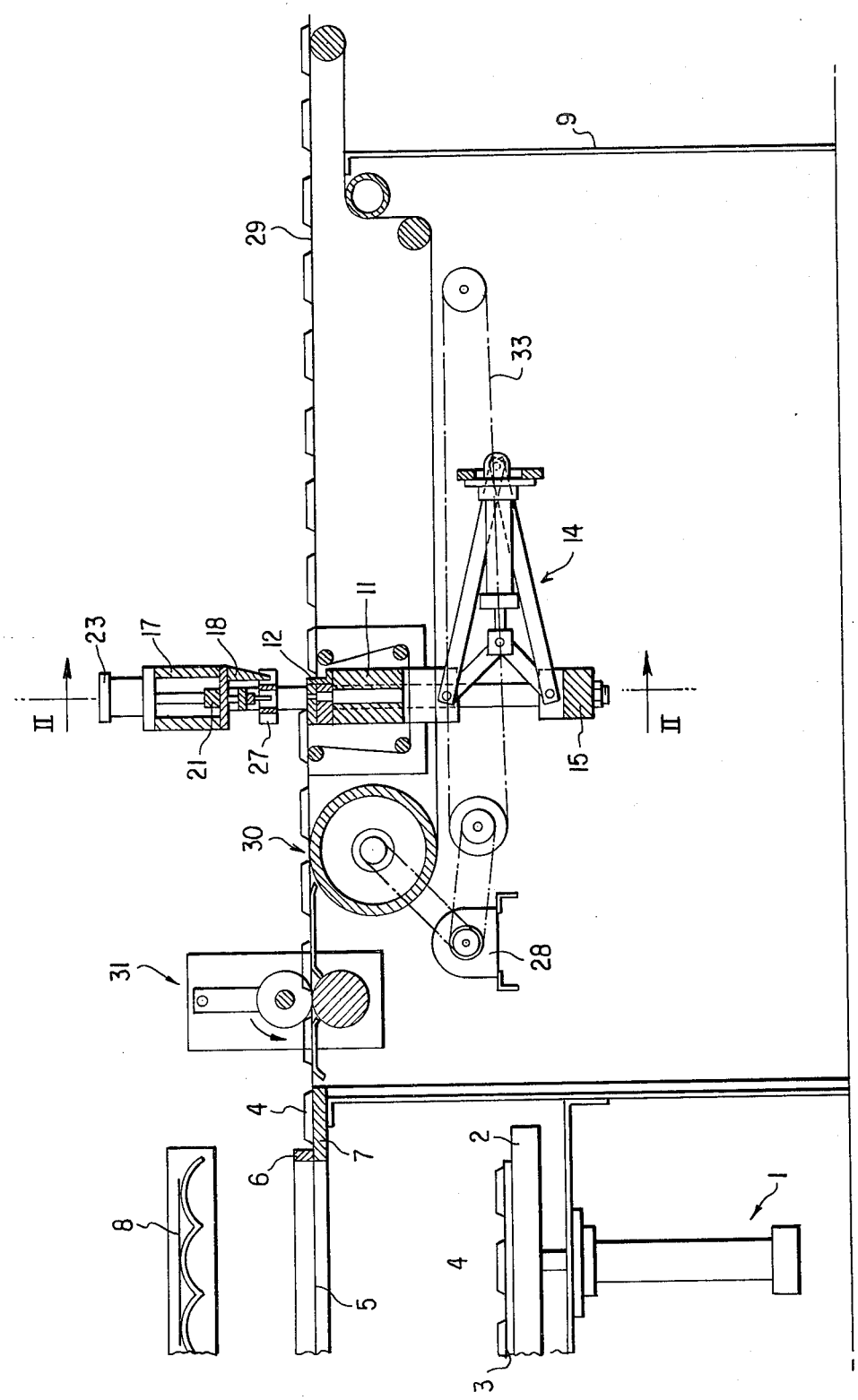
FIG. 1 is a schematic side elevational view of an apparatus incorporating a preferred embodiment of the invention.

Turning now to FIG. 1, the arrangement according to the invention is combined with a skin packing machine 1 known by itself. On a table 2 of the machine 1 there is positioned a cardboard support 3 with a plurality of articles 4. A synthetic foil 5 is drawn from a supply roll and is, from the left side (as viewed in FIG. 1), fed into the operational zone and is clamped by a tensioning frame 6, 7 and heated by means of a heater 8. After raising the table 2, a multi-article skin package is made in a known manner and, subsequent to opening the tensioning frame 6, the packages are conveyed towards the right as a coherent band 30 to be subsequenty severed. The transport from the table 2 and the severing of the band 30 is taken over by the apparatus according to the invention.

Figure 2:
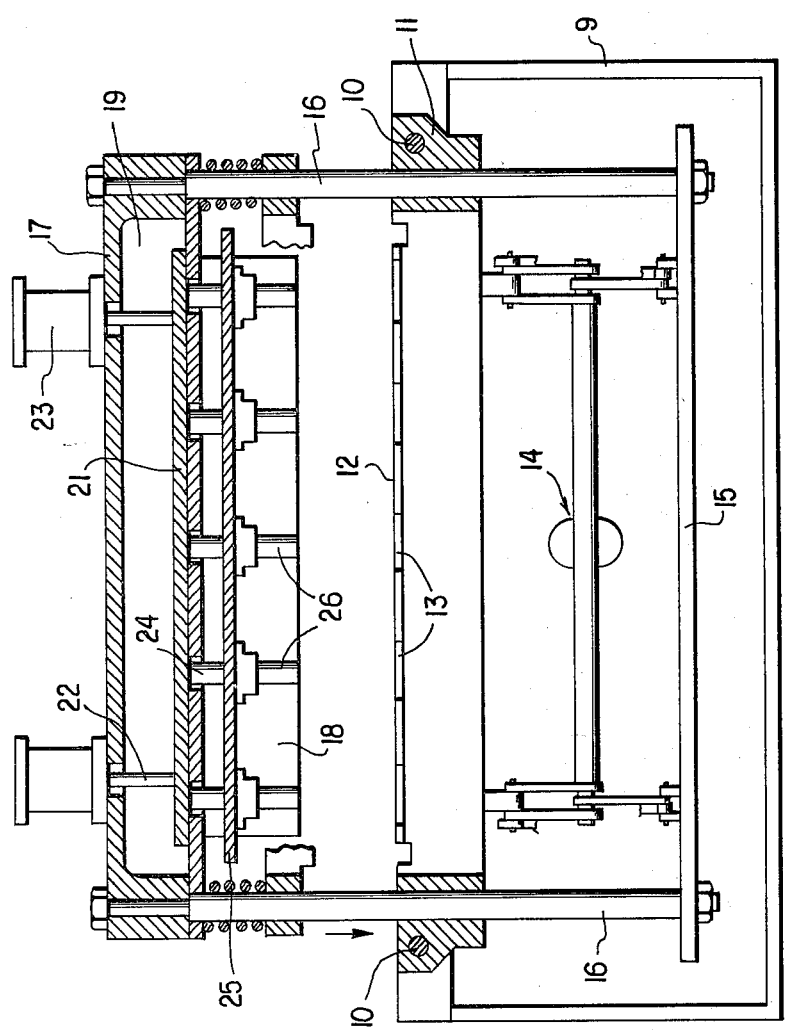
FIG. 2 is a sectional view taken along line II—II of FIG. 1.
Figure 4:
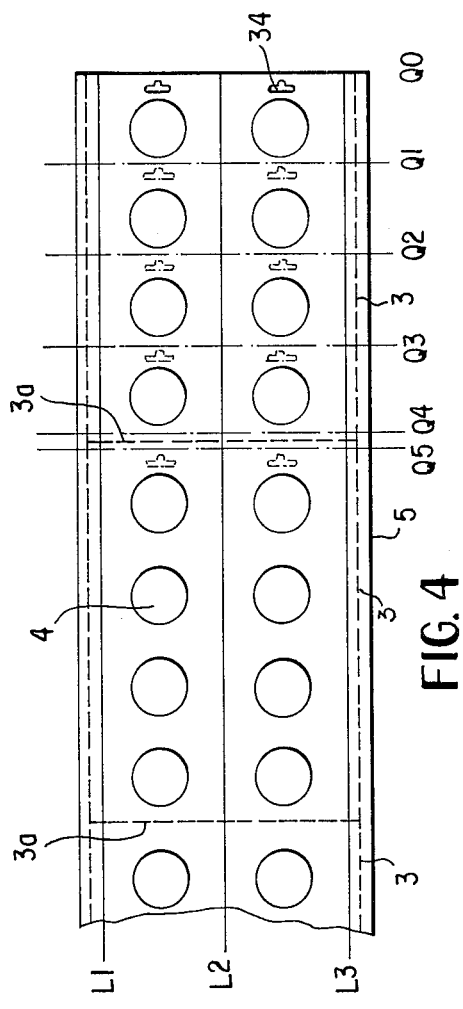
FIG. 4 is a top plan view of a band formed of interconnected multi-article skin packages whose cardboard supports abut without clearance.
Figure 5:
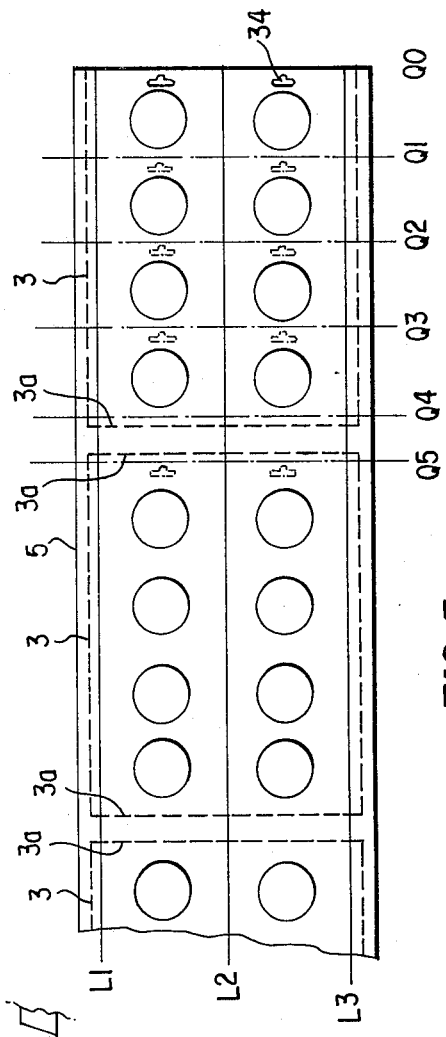
FIG. 5 is a top plan view of a band formed of interconnected multi-article skin packages whose cardboard supports are spaced from one another.

Also referring now to FIG. 2, the conveying and severing apparatus has a frame 9 to which there are affixed guide rods 10 which extend in the direction of package feed. On the guide rods 10 there is displaceably mounted a sled 11 which carries a lower transverse knife 12 for transversely severing the band 30 and matrices 13 for stamping hanger holes 34 (FIGS. 4 and 5). To the sled 11, at the underside thereof, there is articulated an end of a toggle lifter 14 which, at its other end, is supported on a bridge member 15 secured at its ends to rods 16. The latter extend slidably through the sled 11 and are interconnected at the top by a transverse carrier 17.

The transverse carrier 17 has a cavity 19 which, at its underside, is closed by a plate 20. On the plate 20 there is mounted an upper transverse knife 18 which cooperates with the lower transverse knife 12. Within the cavity 19 there extends a transverse bar 21 which is, at its top, coupled with piston rods 22 of cylinders 23 and is, at its underside, connected with spacers 24 which extend downwardly through holes provided in the closure plate 20. At their lower end the spacers 24 are connected with a holder rail 25. To the holder rail 25 there are secured hole punches 26 which may be steplessly adjusted with respect to the holder rail 25 and may be immobilized in their desired position. Similarly, the individual matrices 13 may be adjusted and immobilized on the sled 11.

With the transverse carrier 17 there is connected a resiliently supported hold-down device 27 projecting slightly beyond the lower edge of the transverse cutting knife 18 and the hole punches 26. When the upper transverse cutting knife 18 is lowered, the hold-down device 27 first engages the top of the sled 11 and functions as a clamp as the band 30 is conveyed out of the packing machine 1.

The horizontal displacement of the sled 11 and thus the conveyance of the band 30 is effected by a motor 28 which reciprocates a horizontal chain 33, to the upper flight of which there is attached the sled 11. It is to be understood that other types of drives for the sled 11 are feasible.

For supporting the band 30 there is provided a rotating backup support belt 29 which is driven in a conventional manner. Upstream of the apparatus there is provided a conventional longitudinal cutting device 31 for the transverse cutting of the band 30 and for punching the hanger holes.

In the description which follows, the mode of operation of the above-described conveying and severing apparatus will be set forth.

After the tensioning frame 6 is opened, the sled 11 moves towards the right (as viewed in FIG. 1) while the transverse carrier 17 is in its lowered position and thus the hold-down device 27 rests on the sled 11. During this travel, the sled 11 draws the clamped band 30 by one feeding step to position Q0 as shown in FIGS. 4 and 5. At the same time there is effected a longitudinal severance of the band 30 by the cutter 31, for example, along cuts L1, L2, and L3.

Thereafter the tensioning frame 6 is closed and thus a new packing cycle starts while the transverse carrier 17 is raised and the sled 11 is moved stepwise and toward the left over the stationary band 30. At predetermined locations the sled 11 is stopped and transverse cuts Q1, Q2, Q3, Q4 and Q5 are consecutively effected. This operation may be controlled by limit switches and cam arrangement in a manner conventional by itself. As the transverse cut Q5 is performed, a waste strip is separated between two multi-article packages. After performing cut Q5, the transverse carrier 17 remains in its lower position and clamps the band 30. (Initial position.)

Figure 3:
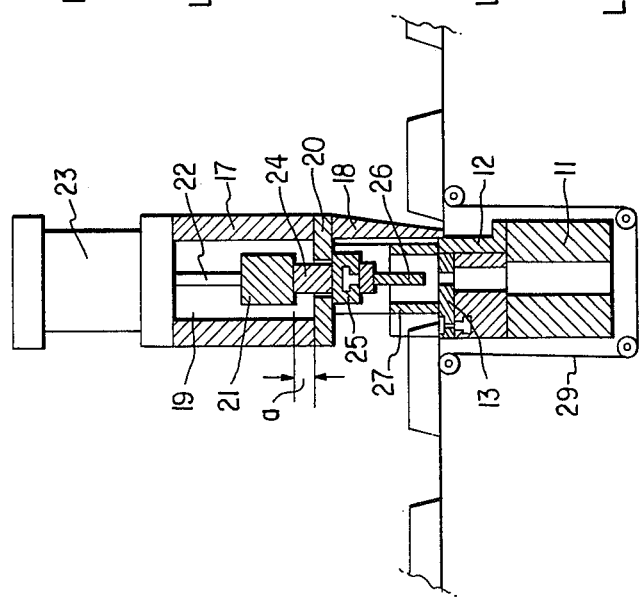
FIG. 3 is an enlarged sectional side elevational view of a detail shown in FIG. 1.

FIG. 4 shows the individual cardboard supports 3 of the multi-article skin packages in a closely abutting relationship along adjoining transverse cardboard edges 3a. The distance between Q4 and Q5 and thus the width of the waste strip may be maintained under 10 mm. The cutting edge of the upper transverse cutter 18 and those of the hole punches 26 are situated in a single plane as the transverse cuts Q1, Q2, Q3, and Q5 are performed. Stated differently, as a package portion with a row of articles is transversely severed, the hanger holes in the successive package portion are simultaneously provided. During the transverse cut Q4, however, lower work chambers of the cylinders 23 are pressurized, so that the transverse bar 21 is lifted off the plate 20 by a distance A, as shown in FIG. 3. As a result, the hole punches 26 are now also recessed upwardly with respect to the transverse cutter 18. Consequently, during the performance of the last transverse cut Q4 into a multi-article skin package, the hole punches 26 are prevented from cutting into the next multi-article skin package at an undesired location in case there is a small distance between two packages (FIG. 4) or from penetrating solely into the foil sheet remaining between two boxes, in case the packages are spaced from one another (FIG. 5).

During the performance of the transverse cuts Q1, Q2, Q3 and Q5, it is the upper work chambers of the cylinders 23 which are pressurized. In this state they oppose the cutting force and are so designed regarding diameters and pressures that the force exerted thereby is a multiple of the cutting force. According to a particular embodiment of the invention, the cylinders 23 press the transverse bar 21 against the plate 20 when the punch holes 26 are in a lowered position; this results in a rigid unit comprising the transverse carrier 17, the closure plate 20, the transverse bar 21, the spacers 24, the holder rail 25 and the hole punches 26. In such a case no other guides for the hole punches 26 are needed and although the latter operate as shears, the punches 26 and the respective matrices 13 are in a sufficient alignment during the punching operation.

The apparatus according to the invention can be set without difficulty to different formats and further, the number and position of the longitudinal cutters and the punch holes can be freely selected. Similarly, the number and position of the transverse cuts can also be freely selected.

Figure 6:
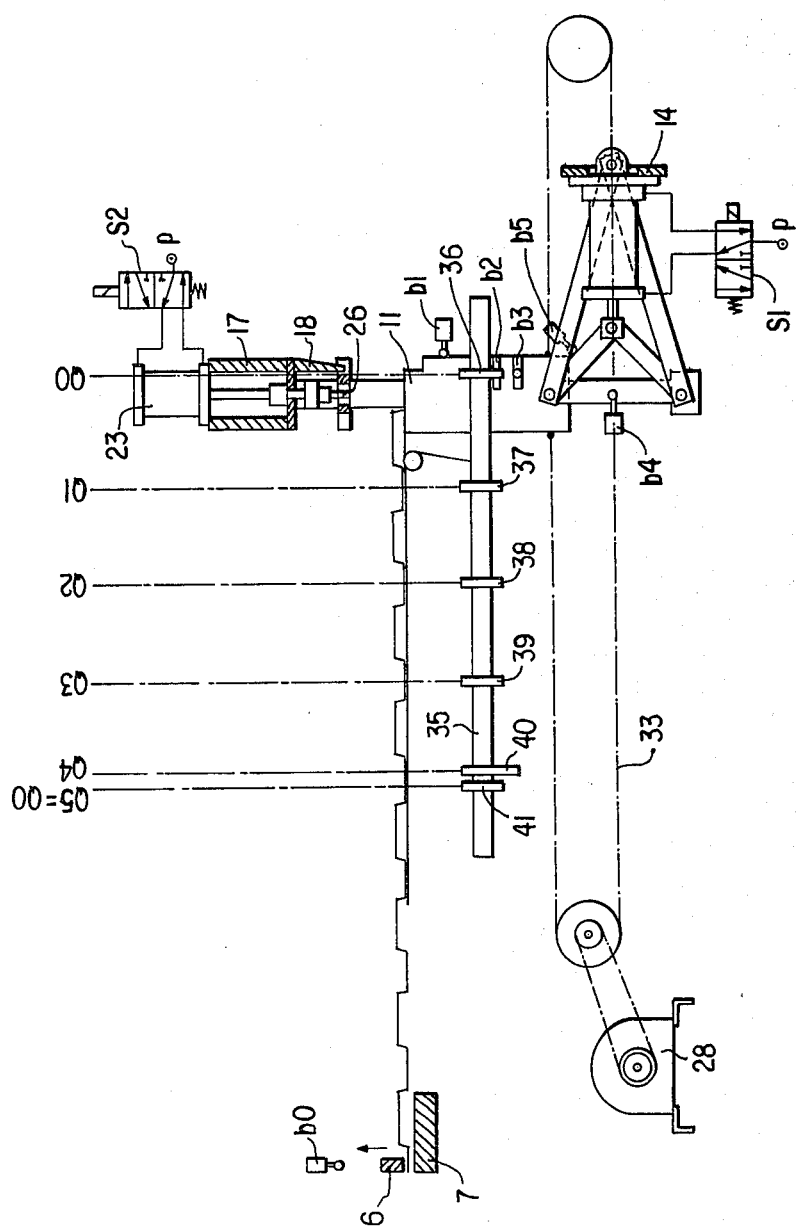
FIG. 6 is a schematic side elevational view of the preferred embodiment, including elements of a control unit.

The mode of operation of the control unit that governs the apparatus is described with reference to FIG. 6. The sled 11 in the starting position stands at the left-hand side (Q0, Q5, respectively) and waits, with transverse carrier 17 lowered, for the linked-up skin packaging machine 1 to have completed the packaging cycle. As soon as the tension frame 6 of the latter opens, switch b0 is actuated, causing a relay to energize, whereupon the motor 28 starts rotating. By pulling the chain 33, the sled 11 is pulled to the right until it meets switch b1. This encounter causes motor 28 to stop on account of the deenergizing of the motor relay, and it triggers valve S1 serving the cylinder of the toggle lifter 14, which in turn causes carrier 17 to move upward. This position is shown in FIG. 6.

A rod 35 extends along the travel path of sled 11 and carries cams 36-41 in those locations where the transverse cuts Q0-Q5 are to be carried out. The two switches b2 and b3 are located at sled 11. After carrier 17 has moved up, switch b5 is actuated by the toggle lifter 14. As a result, a relay is energized for causing a counterclockwise revolution of motor 28, which now operates against direction of material flow for as long as switch b2 meets cam 37. This causes motor 28 to stop and to de-energize valve S1, transverse whereupon the cut Q1 is carried out.

With the carrier 17 in the lower position, switch b4 is tripped, thus causing valve S1 to switch over and carrier 17 to move upward. When the carrier 17 is in its uppermost position, the switch b5 is actuated again, motor 28 is again started via a relay to perform counterclockwise revolution. This continues until the switch b2 is engaged by cam 38. Again the sled 11 stops, and the transverse cut Q2 is carried out. In the same manner, the sled 11 proceeds as far as transverse cut Q3 (switch b2 is engaged by cam 39), then to transverse cut Q4 (switch b2 is engaged by cam 40).

Valve S2 remained deenergized throughout this period, in the position as illustrated, i.e. the hole punches 26 were pushed down by means of the cylinders 23.

Cam 40 is designed to not only actuate the switch b2, but also the switch b3. Change-over of valve S2 is the actuation of switch b3, whereupon the hole punches 26 are moved upward via cylinders 23, so that the hole punches 26 are ineffective while the transverse cut Q4 is carried out. After transverse cut Q4 is terminated, the carrier 17 moves up again, the sled 11 travels to the left as far as transverse cut Q5 (cam 41 actuates switch b2). Since the switch b3 is not actuated at the time of transverse cut Q5 being carried out, the hole punches 26 are again driven downward by means of the cylinder 23. This means that while the transverse cut Q5 is carried out, punching of the hanger holes 34 takes place as well. After this transverse cut Q5, the carrier 17 remains in its downward position. The operational sequence is restarted after the tension frame 6 has opened and has actuated switch b0.

It is to be understood that the above description of the present invention is susceptible to various modifications, changes and adaptations and the same are intended to be comprehended within the meaning and range of equivalents of the appended claims.

What is claimed is:

1. In an apparatus for withdrawing a continuous band of multi-article skin packages from a skin packing machine; the apparatus including clamping means for periodically grasping the band and stepwise withdrawing it from the skin packing machine in a direction of band feed; first cutting means for severing the band parallel to the direction of band feed; second cutting means for severing the band transversely to the direction of band feed; the first and second cutting means dividing each multi-article skin package into smaller packages having a reduced number of articles; punching means for providing hanger holes in the packages simultaneously with the severing operation of the second cutting means; a sled carrying the clamping means, the second cutting means and the punching means and being arranged to travel back and forth parallel to the direction of band feed; and control means for intermittently and simultaneously actuating the second cutting means and the punching means at predeterminable locations during the travel of the sled against the direction of band feed; the improvement comprising deactivating means for rendering said punching means inoperative at predeterminable positions of said sled.

2. An apparatus as defined in claim 1, further comprising a carrier member mounted on said sled for vertical reciprocation with respect thereto; said second cutting means including cooperating upper and lower knives mounted, respectively, on said carrier member and said sled; said punching means including a hole punch mounted on said carrier member and a matrix cooperating with said hole punch and mounted on said sled; said deactivating means including force-exerting means for maintaining said hole punch in an operative position in which said hole punch is substantially at the same level as said upper knife and for lifting said hole punch with respect to said carrier member into and maintaining it in an inoperative position in which said hole punch is at a greater height level than said upper knife.

3. An apparatus as defined in claim 2, wherein said force exerting means comprises a hydraulic power cylinder affixed to said carrier member and a piston rod extending from the power cylinder and operatively connected to said hole punch.

4. An apparatus as defined in claim 2, wherein there are provided a plurality of hole punches and matrices cooperating therewith; said hole punches being arranged spaced from one another and parallel to said upper knife; further comprising a transverse rail operatively connected to said force-exerting means to be moved vertically thereby; said hole punches being affixed to said transverse rail.

5. An apparatus as defined in claim 4, further comprising means defining a cavity in said carrier member;

a closure plate affixed to said carrier member and covering an underside of said cavity; said deactivating means further comprising a transverse bar vertically movably arranged within said cavity and connected to said force-exerting means; a plurality of spacers passing through said closure plate and being affixed to said transverse rail; said transverse rail being situated externally of said cavity; said transverse bar being pressed by said force-exerting means into engagement with said closure plate in said operative position of said hole punches.

* * * * *